US012585371B2

(12) United States Patent
Liu

(10) Patent No.: US 12,585,371 B2
(45) Date of Patent: Mar. 24, 2026

(54) DISPLAY CONTROL METHOD AND APPARATUS FOR POINTER IN WINDOW, DEVICE, AND STORAGE MEDIUM

(71) Applicant: Honor Device Co., Ltd., Shenzhen (CN)

(72) Inventor: Shicong Liu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 145 days.

(21) Appl. No.: 18/549,408

(22) PCT Filed: Apr. 25, 2022

(86) PCT No.: PCT/CN2022/089062
§ 371 (c)(1),
(2) Date: Sep. 7, 2023

(87) PCT Pub. No.: WO2023/029526
PCT Pub. Date: Mar. 9, 2023

(65) Prior Publication Data
US 2024/0184414 A1    Jun. 6, 2024

(30) Foreign Application Priority Data
Aug. 30, 2021    (CN) .......................... 202111002753.2

(51) Int. Cl.
*G06F 3/04812*        (2022.01)
*G06F 3/14*           (2006.01)
(52) U.S. Cl.
CPC ........ *G06F 3/04812* (2013.01); *G06F 3/1454* (2013.01)

(58) Field of Classification Search
None
See application file for complete search history.

(56) References Cited

U.S. PATENT DOCUMENTS

| | | | |
|---|---|---|---|
| 10,126,927 B1 | 11/2018 | Fieldman | |
| 2004/0168149 A1* | 8/2004 | Nirell ...................... | G06F 9/453 |
| | | | 717/124 |
| 2007/0115254 A1 | 5/2007 | Wu | |

(Continued)

FOREIGN PATENT DOCUMENTS

| | | |
|---|---|---|
| CN | 103399657 A | 11/2013 |
| CN | 109426360 A | 3/2019 |

(Continued)

*Primary Examiner* — Toan H Vu
(74) *Attorney, Agent, or Firm* — Conley Rose, P.C.

(57)        ABSTRACT

A display control method and apparatus for a pointer in a window, a device, and a storage medium. A first device projects a screen onto a second device to generate a collaboration window. When a user performs an operation through a mouse of the second device, in response to a mouse pointer of the second device being in a first area of the collaboration window, the mouse pointer is displayed in a first shape, and in response to the mouse pointer of the second device being in a second area of the collaboration window, the mouse pointer is displayed in a second shape. In this way, the second device can dynamically configure a display shape of the pointer of the second device in the collaboration window based on pointer shape information.

20 Claims, 9 Drawing Sheets

(56)                    References Cited

U.S. PATENT DOCUMENTS

| | | | |
|---|---|---|---|
| 2011/0231796 A1* | 9/2011 | Vigil | G06F 3/04883 |
| | | | 715/810 |
| 2011/0246904 A1 | 10/2011 | Pinto et al. | |
| 2012/0229379 A1 | 9/2012 | Louch | |
| 2016/0216932 A1 | 7/2016 | Pettersson et al. | |
| 2017/0024100 A1* | 1/2017 | Pieper | H04L 12/1827 |
| 2017/0322762 A1* | 11/2017 | Duong | B43L 1/00 |
| 2019/0064947 A1* | 2/2019 | Saito | G06F 3/03545 |
| 2019/0179501 A1* | 6/2019 | Seeley | G06F 16/178 |
| 2020/0371663 A1* | 11/2020 | Rubinstein | G06F 3/04812 |
| 2021/0026508 A1* | 1/2021 | Jacobs | G06T 1/20 |
| 2022/0066725 A1 | 3/2022 | Xia | |
| 2022/0107727 A1* | 4/2022 | Khan | G06F 3/023 |
| 2022/0108276 A1* | 4/2022 | Stringham | G06F 9/451 |
| 2022/0122037 A1* | 4/2022 | Somlai-Fischer | |
| | | | G06F 3/04812 |
| 2022/0147228 A1 | 5/2022 | Yi et al. | |
| 2022/0164091 A1 | 5/2022 | Kang | |
| 2022/0300153 A1 | 9/2022 | Gu et al. | |
| 2022/0308679 A1 | 9/2022 | Wu et al. | |
| 2022/0326825 A1 | 10/2022 | Niu | |
| 2022/0342850 A1 | 10/2022 | Cao et al. | |

FOREIGN PATENT DOCUMENTS

| | | |
|---|---|---|
| CN | 110347269 A | 10/2019 |
| CN | 110471584 A | 11/2019 |
| CN | 110471639 A | 11/2019 |
| CN | 110673782 A | 1/2020 |
| CN | 111158543 A | 5/2020 |
| CN | 111880870 A | 11/2020 |
| CN | 112527221 A | 3/2021 |
| CN | 112905136 A | 6/2021 |
| CN | 113867580 A | 12/2021 |
| EP | 2706740 A1 | 3/2014 |
| EP | 3889761 A1 | 10/2021 |
| WO | 2020134872 A1 | 7/2020 |

* cited by examiner

DISPLAY CONTROL METHOD AND APPARATUS FOR POINTER IN WINDOW, DEVICE, AND STORAGE MEDIUM

CROSS-REFERENCE TO RELATED APPLICATIONS

This is a U.S. National Stage of International Application No. PCT/CN2022/089062 filed on Apr. 25, 2022, which claims priority to Chinese Patent Application No. 202111002753.2, filed with the China National Intellectual Property Administration on Aug. 30, 2021, both of which are incorporated herein by reference in their entireties.

TECHNICAL FIELD

This application relates to the technical field of computers, and in particular, to a display control method and apparatus for a pointer in a window, a device, and a storage medium.

BACKGROUND

When a mobile phone of a user cooperates with a target device (such as a PC device, a PAD, or a large-screen device), an application on the mobile phone is displayed on a target device in a collaboration window. Since the collaboration window transmits a click event instead of a mouse, if the user desires to select a text in the collaboration window by using the mouse, the user has to press the mouse and hold to trigger text selection since a mode in which a mouse pointer is moved onto a text and changes into a text pointer which is then clicked and dragged to select a target text is not provided, which makes an operation inconvenient and affects user experience.

SUMMARY

Embodiments of this application provide a display control method and apparatus for a pointer in a window, a device, and a storage medium. A first device projects a screen onto a second device to generate a collaboration window. When a user performs an operation through a mouse of the second device, in response to a mouse pointer of the second device being in a first area of the collaboration window, the mouse pointer is displayed in a first shape, and in response to the mouse pointer of the second device being in a second area of the collaboration window, the mouse pointer is displayed in a second shape. In this way, the second device can dynamically configure a display shape of the pointer of the second device in the collaboration window based on pointer shape information.

According to a first aspect, an embodiment of this application provides a display control method for a pointer in a window, where a first device projects a screen onto a second device to generate a collaboration window, and the method includes: displaying a mouse pointer in a first shape in response to the mouse pointer of the second device being in a first area of the collaboration window; and displaying the mouse pointer in a second shape in response to the mouse pointer of the second device being in a second area of the collaboration window.

Further, contents displayed in the collaboration window are the same as contents displayed in a display interface of the first device; and the second area includes an area occupied by each control in the collaboration window, and the first area is an area other than the second area in the collaboration window.

Further, the area occupied by each display control in the collaboration window includes a text area and an image area, and the text area is an area occupied by a text control in the collaboration window, and the image area is an area occupied by an image control in the collaboration window.

Further, the displaying the mouse pointer in a second shape in response to the mouse pointer of the second device being in a second area of the collaboration window includes the following steps performed by the first device: receiving, from the second device, relative position information of the mouse pointer in the collaboration window relative to the display interface of the first device; obtaining pointer shape information matching a target sub-area if it is determined that the relative position information is in the target sub-area of the display control of the first device; and feeding back the pointer shape information matching the target sub-area to the second device, so that the second device displays the mouse pointer in the second shape in response to the mouse pointer of the second device being in the second area of the collaboration window.

Further, before it is determined that the relative position information is in the target sub-area of the display control of the first device, the method further includes: simulating a mouse pointer input based on the relative position information of the mouse pointer of the second device on the display interface of the first device.

Further, the determination of the relative position information being in the target sub-area of the display control of the first device includes: in a stage of simulating the mouse pointer input, determining, based on a monitored mouse pointer movement event, whether a current position of the mouse pointer falls in the target sub-area of the display control of the first device, and if so, determining that the relative position information is in the target sub-area of the display control of the first device.

Further, in the stage of simulating the mouse pointer input, properties of the mouse pointer are set, and the properties of the mouse pointer include visible properties, and the setting properties of the mouse pointer includes setting the visible properties of the mouse pointer to hidden.

Further, the obtaining mouse pointer shape information matching the target sub-area includes: determining, based on a mapping relationship between the target sub-area and a mouse shape, the mouse pointer shape information corresponding to the target sub-area where the current position of the mouse pointer falls.

Further, before the receiving, from the second device, relative position information of the mouse pointer in the collaboration window relative to the display interface of the first device, the method further includes: synchronizing one or more sets of pointer icon libraries on the first device side to the second device, so that the second device parses the pointer shape information matching the target sub-area based on the received pointer icon library, and then obtaining a current pointer shape.

Further, the displaying the mouse pointer in a second shape in response to the mouse pointer of the second device being in a second area of the collaboration window includes the following steps performed by the second device: sending the relative position information of the mouse pointer in the collaboration window relative to the display interface of the first device to the first device; and receiving the pointer shape information fed back by the first device, and configuring a display shape of the mouse pointer in the collaboration window based on the pointer shape information.

Further, before the sending the relative position information of the mouse pointer in the collaboration window relative to the display interface of the first device to the first device, the method further includes: obtaining position information of the mouse pointer of the second device in the collaboration window, and converting, based on a ratio of the collaboration window to the display interface of the first device, the position information of the mouse pointer of the second device in the collaboration window into relative position information of the mouse pointer of the second device on the display interface of the first device.

Further, before the sending the relative position information of the mouse pointer in the collaboration window relative to the display interface of the first device to the first device, the method further includes: obtaining one or more sets of pointer icon libraries synchronized by the first device; and the configuring a display shape of the mouse pointer in the collaboration window based on the pointer shape information includes: parsing the pointer shape information matching the target sub-area based on the received pointer icon library, and then obtaining a current pointer shape.

According to a second aspect, an embodiment of this application provides a display control method for a pointer in a window, where a first device projects a screen onto a second device to generate a collaboration window, and the method includes: receiving relative position information of a mouse pointer in the collaboration window relative to a display interface of the first device that is sent by the second device; obtaining pointer shape information matching a target sub-area if it is determined that the relative position information is in the target sub-area of the display control of the first device; feeding back the pointer shape information matching the target sub-area to the second device, so that the second device displays the mouse pointer in the first shape in response to the mouse pointer of the second device being in the first area of the collaboration window; and the second device displays the mouse pointer in a second shape in response to the mouse pointer of the second device being in a second area of the collaboration window.

According to a third aspect, an embodiment of this application provides a display control apparatus for a pointer in a window, including: a processor and a memory, where the memory is configured to store at least one instruction, and when the instruction is loaded and executed by the processor, the display control method for a pointer in a window according to the first aspect or the second aspect is implemented.

In an implementation, the display control apparatus of the pointer in the window provided by the second aspect may be a component element of a terminal, where the component may be a chip.

According to a fourth aspect, an embodiment of this application further provides an electronic device. The electronic device includes the display control apparatus for the pointer in the window provided by the third aspect. The electronic device is a device having a display function.

According to a fifth aspect, an embodiment of this application further provides an electronic device. The electronic device includes one or more processors and a memory, where the memory is configured to store at least one instruction, and when the instruction is loaded and executed by the processor, the display control method for a pointer in a window according to the first aspect or the second aspect is implemented.

According to a sixth aspect, an embodiment of this application further provides a first device and a second device, where the first device and the second device are the electronic device according to the third aspect or the fourth aspect. In an implementation, the first device may be the mobile phone, the second device may be the PC device, and the mobile phone projects a screen to the PC device and generates a corresponding collaboration window on the PC device. The display content of the collaboration window can be consistent with the display content of the display interface of the mobile phone.

According to a seventh aspect, an embodiment of the present invention further provides a computer-readable storage medium, storing a computer program. When the computer program is executed by a processor, the display control method for a pointer in a window according to the first aspect or the second aspect is implemented.

Through the above technical solution, the first device projects a screen on the second device to generate a collaboration window. When the user operates the mouse of the second device, the position information of the pointer of the second device relative to the display screen of the first device can be obtained. If it is determined that the position information falls in the target sub-area of the display control, the pointer shape information corresponding to the target sub-area is fed back to the second device, so that the second device dynamically configures the display shape of the pointer of the second device in the collaboration window based on the pointer shape information, thereby improving convenience of the user operation.

BRIEF DESCRIPTION OF DRAWINGS

In order to describe the technical solutions in embodiments of this application or the related art more clearly, the following briefly describes the accompanying drawings required for describing the embodiments or the related art. Apparently, the accompanying drawings in the following description show some embodiments of this application, and those of ordinary skill in the art may still derive other accompanying drawings from the accompanying drawings without creative efforts.

DESCRIPTION OF EMBODIMENTS

To make the objectives, technical solutions, and advantages of embodiments of this application clearer, the following clearly and completely describes the technical solutions in embodiments of this application with reference to the accompanying drawings in embodiments of this application. Apparently, the described embodiments are some rather than all of embodiments of this application. All other embodiments obtained by a person of ordinary skill in the art based on embodiments of this application without making creative efforts shall fall within the protection scope of this application.

Figure 1:
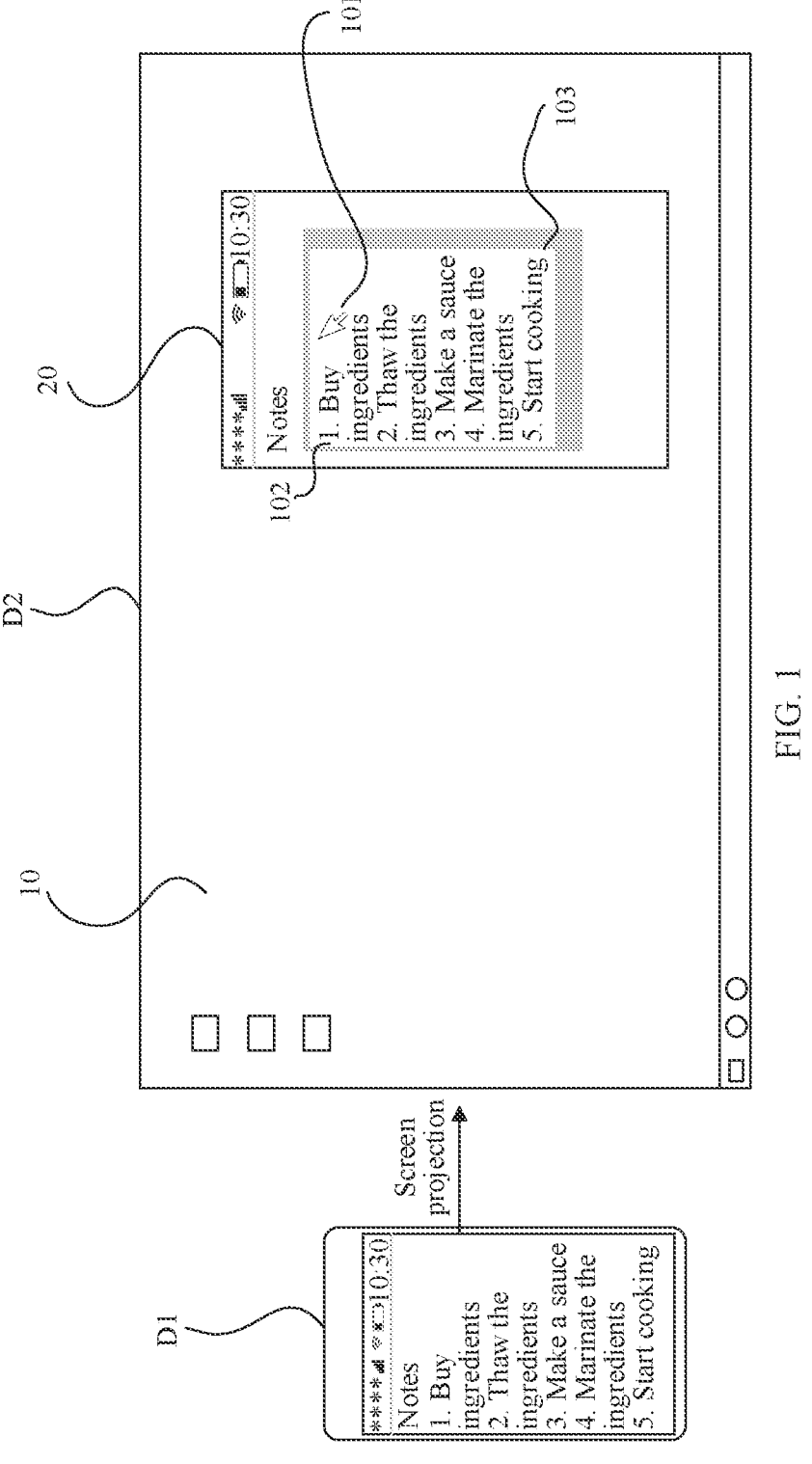
FIG. 1 is a schematic diagram of a collaboration window in the prior art.

In some related scenarios, a user uses a mobile phone to cooperate with another display device for a collaborative operation. For example, the user uses the mobile phone to cast a screen to a PC device, and generates a corresponding collaboration window on the PC device. However, when the user performs a direction control operation in the collaboration window through a mouse of the PC device, a shape of the mouse pointer of the PC device cannot be transformed based on a real-time position of the mouse pointer. FIG. 1 is a schematic diagram of a collaboration window in the related art. As shown in FIG. 1, a mobile phone D1 of the user projects a screen to a PC device D2, and then generates a collaboration window 20 in a PC display interface 10 of the PC device D2. The collaboration window shown in FIG. 1 is an application interface of a mobile phone memo. When the user performs text selection by operating the mouse of the PC device D2 and sliding the mouse pointer 101 to a text area of the collaboration window 20, a type of the mouse pointer 101 in the text area of the collaboration window 20 is still a normal selection. If the user desires to perform text selection in the collaboration window 20 by operating the mouse of the PC device D2, the user can only trigger the text selection by long pressing the mouse, and then drag a start position 102 and an end position 103 of a text selection marker bar to select the target text, respectively after the text selection is triggered.

In the above related scenario, when the mouse of the PC device D2 operates in the collaboration window 20, a click event is passed. That is, the operation of clicking on a display screen of the mobile phone through a finger (or a stylus) is replaced by clicking on the mouse. Therefore, after the user misses the mouse pointer 101 and moves to the text area when operating through the mouse of the PC device, the pointer (the normal selection type) is converted into a text selection pointer, and an experience of selecting the target text by long pressing and dragging the text selection pointer.

The above is explained by using the text selection as an example. There are also corresponding problems in another scenario. For example, when the mouse pointer 101 of the PC device D2 moves to a boundary of a picture in the collaboration window 20, the mouse pointer 101 cannot be converted into a size adjustment pointer (a horizontal adjustment pointer, a vertical adjustment pointer, or a diagonal adjustment pointer), and the user lacks the experience of adjusting the size of the picture by long pressing and dragging the size adjustment pointer. Corresponding problems existing in another scenario are not be repeated here.

To overcome the above technical problems, an embodiment of this application provides a display control method for a pointer in a window. In an application scenario in which the first device projects a screen to the second device to generate a collaboration window on the second device, when the user operates in the collaboration window through the mouse of the second device, the mouse pointer is displayed in a first shape in response to the mouse pointer being in the collaboration window in the first area. The mouse pointer is displayed in a second shape in response to the mouse pointer in the collaboration window being in the second area. Further, the second device can dynamically configure the display shape of the pointer of the second device in the collaboration window based on the pointer shape information, which can improve convenience of the user operation.

Figure 2:
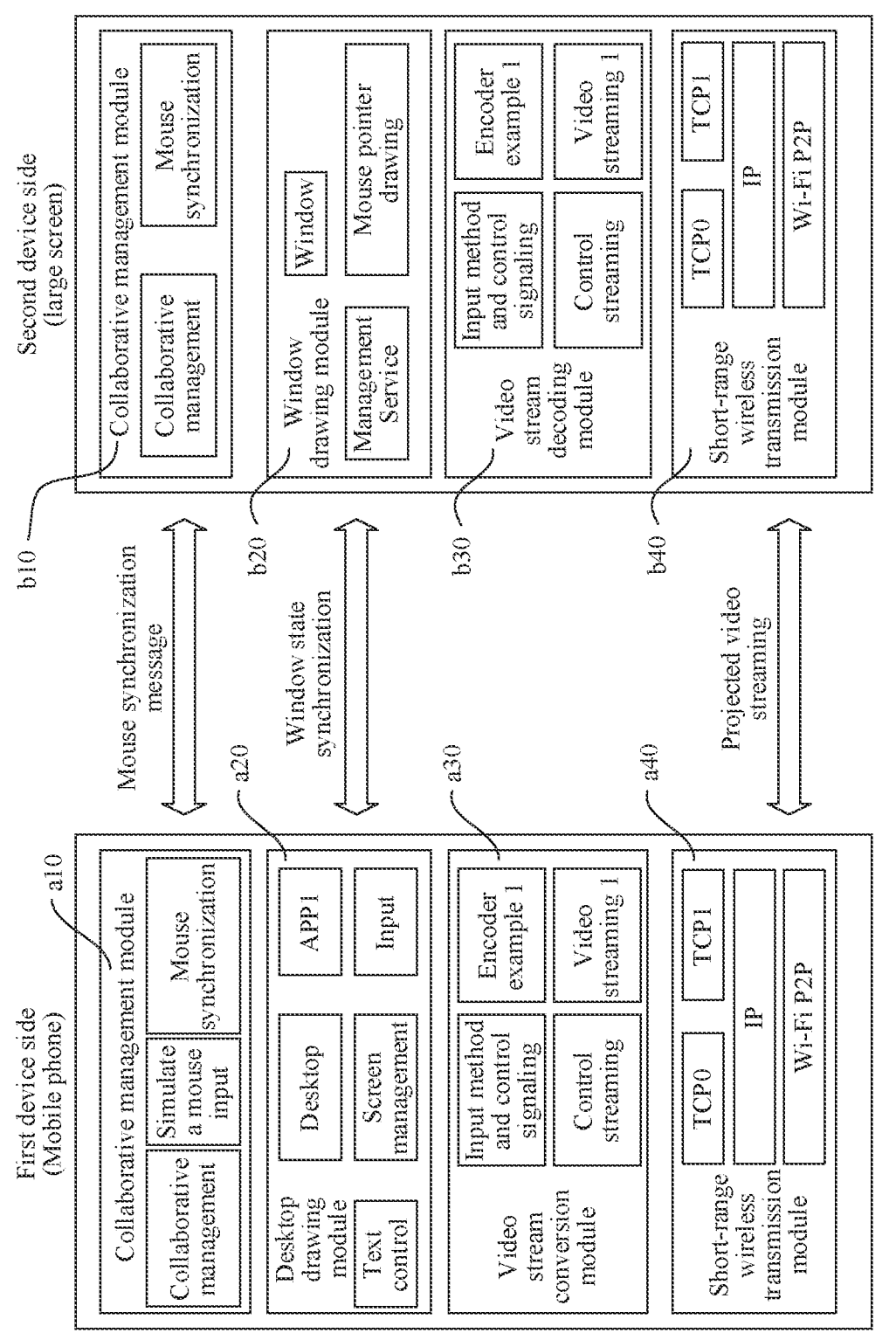
FIG. 2 is a schematic diagram of an architecture of a collaborative operating system according to another embodiment of this application.

To realize the display control method of the pointer in the window, an embodiment of this application provides an architecture of a collaborative operating system. As shown in FIG. 2, the first device includes a collaborative management module a10, a desktop drawing module a20, a video stream conversion module a30, and a short-range wireless transmission module a40. The second device includes a collaborative management module b10, a window drawing module b20, a video stream decoding module b30, and a short-range wireless transmission module b40. In an application scenario where the first device projects a screen on the second device to generate a collaboration window, the video stream conversion module a30 of the first device converts screen projection data into a projected video stream, and then the first device can transmit the projected video stream to the second device through the short-range wireless transmission module a40. The second device receives the projected video stream transmitted by the first device through the short-range wireless transmission module b40. The second device decodes the received projected video stream through the video stream decoding module b30, draws a collaboration window on the display interface of the second device through the window drawing module, and keeps the collaboration window synchronized with a display interface state of the first device. The corresponding steps may be performed by the collaborative management module a10 of the first device and the collaborative management module b10 of the second device, respectively, to realize the display control method of the pointer in the window. A detailed description is provided below.

Figure 3:
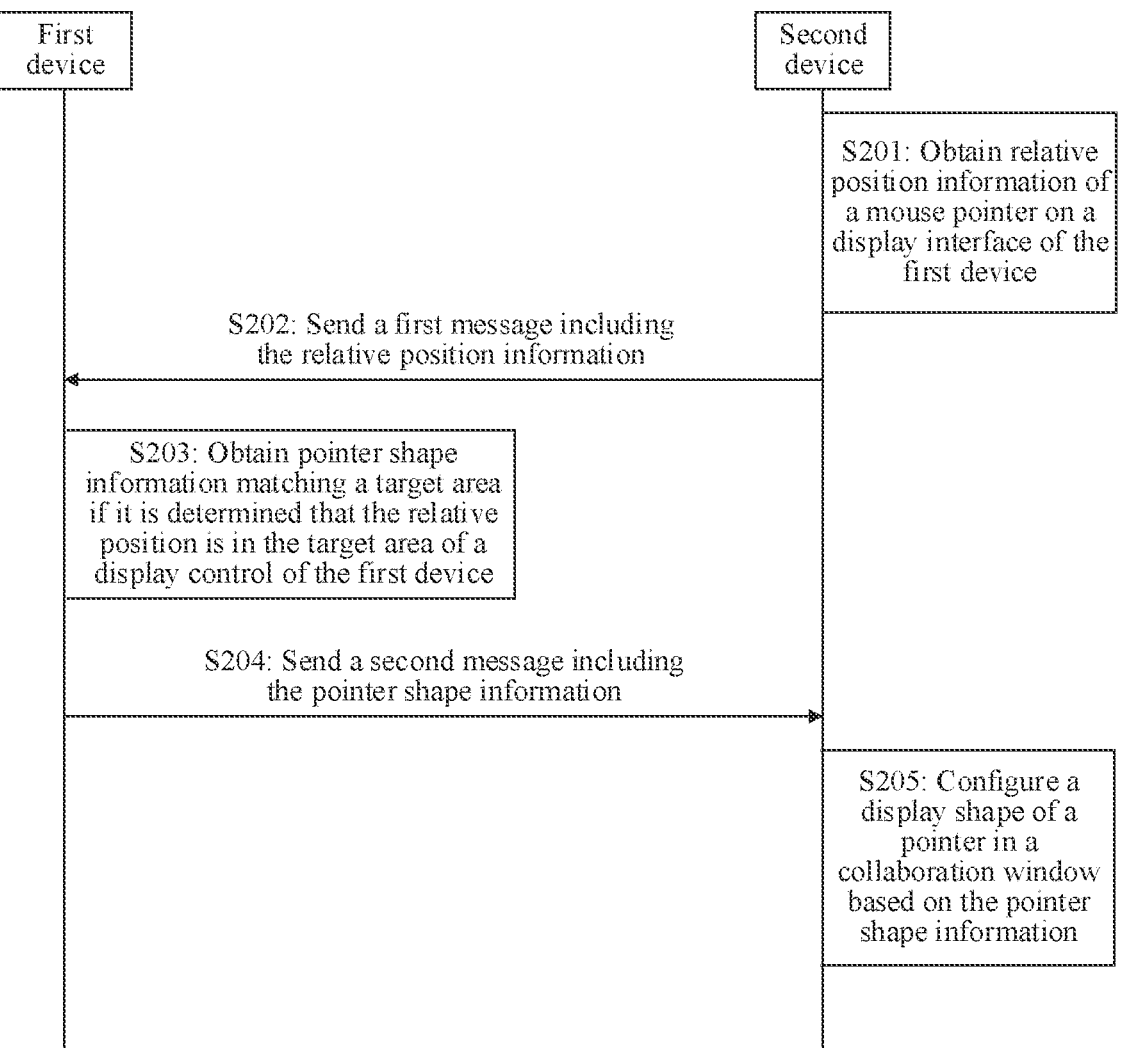
FIG. 3 is a flowchart of a display control method for a pointer in a window according to an embodiment of this application.

FIG. 3 is a display control method for a pointer in a window according to an embodiment of this application. As shown in FIG. 3, the display control method of the pointer in the window may include the following steps.

Step 201: The second device obtains relative position information of the mouse pointer in the display interface of the first device.

Step 202: The second device sends a first message to the first device, where the first message includes the relative position information of the mouse pointer in the display interface of the first device.

Step 203: When the first device determines that the relative position information in the first message is in a target sub-area of a display control of the first device, the first device obtains pointer shape information that matches the target sub-area.

Step 204: The first device sends a second message to the second device, where the second message includes pointer shape information that matches the target sub-area.

Step 205: The second device configures the display shape of the pointer in the collaboration window based on the pointer shape information.

In a scenario, the first device may be a mobile phone, the second device may be a large-screen device, and the mobile phone projects a screen to a large screen and generates a corresponding collaboration window on the display interface of the large screen. But it is not limited to the above scenario, and the first device or the second device can also be another smart device with display functions.

Before performing step 201, the first device may also synchronize the corresponding data of the device to the second device.

Specifically, before the first device projects the screen to the second device to draw the corresponding collaboration window on the second device, the first device can synchronize the corresponding data of the pointer icon library applied by the device to the second device through collaborative connection between the first device and the first device, so that the pointer icon libraries on both sides of the first device and the second device can be synchronized.

The first device side may store a plurality of sets of pointer icon databases, where each set of pointer icon databases may include various types of pointer icon shapes.

In an implementation, the first device can synchronize data of all pre-stored sets of pointer icon libraries to the second device.

In another implementation, the first device can synchronize the data of the target pointer icon library selected by the user to the second device.

Figure 4A:
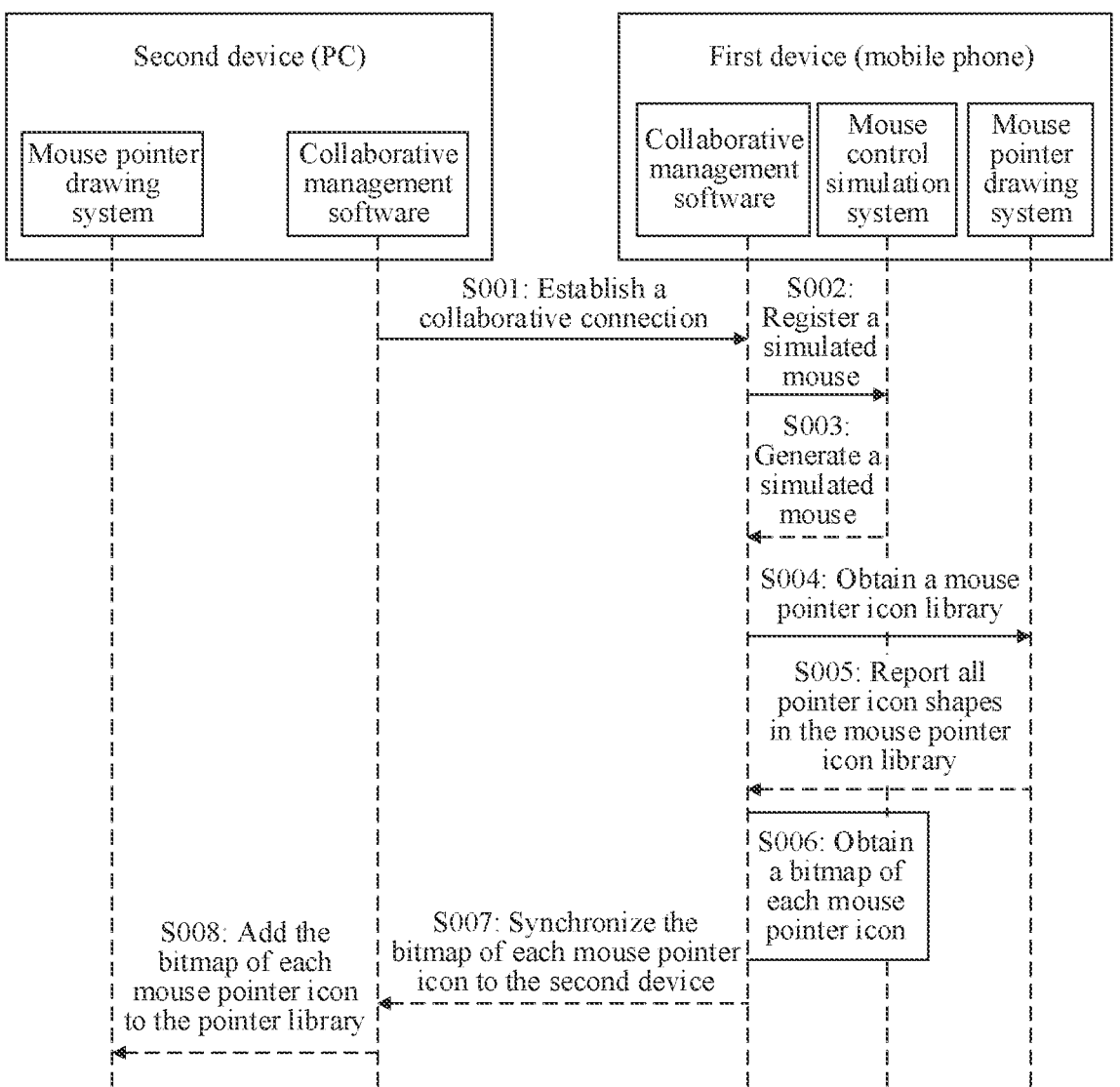
FIG. 4a is a schematic flowchart of a first device providing a pointer icon library to a second device according to an embodiment of this application.

FIG. 4a is a schematic flowchart of a first device providing a pointer icon library to a second device according to an embodiment of this application. As shown in FIG. 4a, after the first device and the second device establish the collaborative connection, the first device can synchronize the data of the pointer icon library to the second device. The synchronization process may include the following steps.

Step 001: The first device establishes the collaborative connection with the second device.

Step 002: The collaborative management software in the collaborative management module of the first device side requests a mouse control simulation system to register a simulated mouse.

Step 003: The mouse control simulation system of the first device side generates a simulated mouse based on the request, and feeds back a result of generating the simulated mouse to the collaborative management software.

Step 004: The collaborative management software of the first device side may also request to obtain data of a mouse pointer icon library from a mouse pointer drawing system.

Step 005: The mouse pointer drawing system of the first device side reports all mouse pointer icon shapes in a current mouse pointer icon library to the collaborative management software based on the request.

Step 006: The collaborative management software of the first device converts each mouse pointer icon into a corresponding bitmap.

Step 007: The collaborative management software of the first device synchronizes the bitmap of each mouse pointer icon to the collaborative management software of the second device.

Step 008: The mouse pointer drawing system of the second device adds the obtained mouse pointer icons to the pointer icon library.

The above is an implementation of a synchronization process in which the first device synchronizes the data of the pointer icon library to the second device. It should be noted that the synchronization process of the pointer icon library data in the embodiment of this application includes but is not limited to the synchronization process provided by the embodiment shown in FIG. 4a.

After the first device (such as the mobile phone D1) starts screen projection to the second device (such as the PC device D2, hereinafter also referred to as the PC), the second device displays screen projection content of the first device in the collaboration window 20b. In an implementation, the display content in the collaboration window may be consistent with the display content of the display interface of the first device. To facilitate user operation, the second device may also configure a window control bar 20a for the collaboration window. Specifically, the user can adjust a window size (minimize or maximize) or close the window by clicking a button in the window control bar 20a. Further, the second device may also configure an operation control bar 20c for the collaboration window. The operation control bar can simulate a touch case of the first device (such as the mobile phone D1), and then the user can realize the same operation experience as the first device side (such as the mobile phone D1) by clicking a device simulation button in the operation control bar 20c.

Figure 4B:
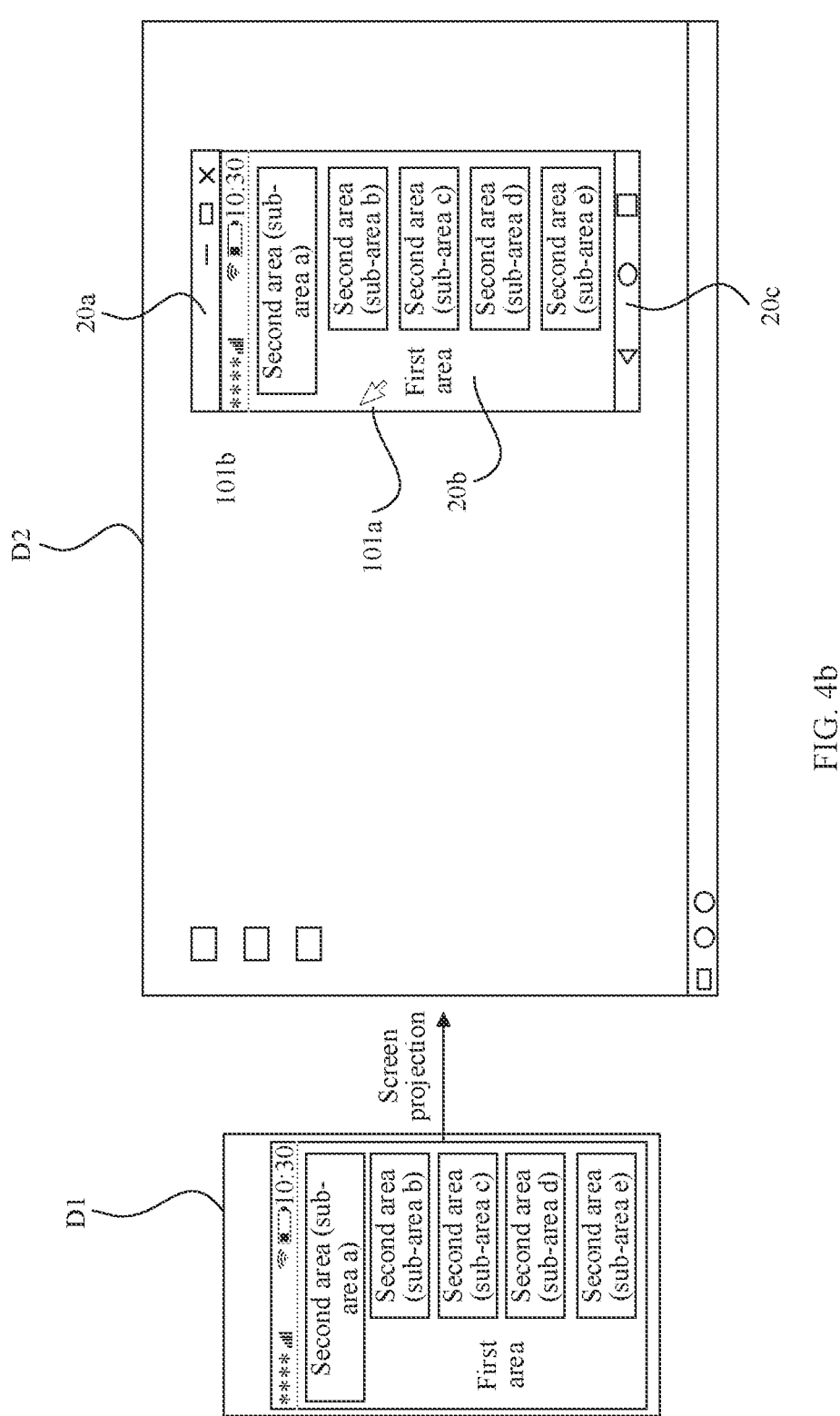
FIG. 4b is a schematic diagram of an area division of a collaboration window according to an embodiment of this application.

In an implementation, the collaboration window 20b can be divided into two types of areas: a first area and a second area. FIG. 4b is a schematic diagram of an area division of a collaboration window according to an embodiment of this application. As shown in FIG. 4b, the second area includes an area occupied by each control in the collaboration window, and the first area is an area other than the second area in the collaboration window. In some scenarios, the area occupied by each display control in the collaboration window may include a text area and an image area. The text area is an area occupied by a text control in the collaboration window, the image area is an area occupied by an image control in the collaboration window, and the second area may be a plurality of different types of sub-areas.

In a specific implementation of step 201, after the pointer of the second device moves into the collaboration window, the second device may obtain the position information of the pointer of the second device in the collaboration window, and may convert the position information of the pointer of the second device in the collaboration window into the relative position information of the pointer of the second device in the display interface of the first device based on a ratio of the collaboration window in the display interface of the second device to the display interface of the first device.

Figure 5:
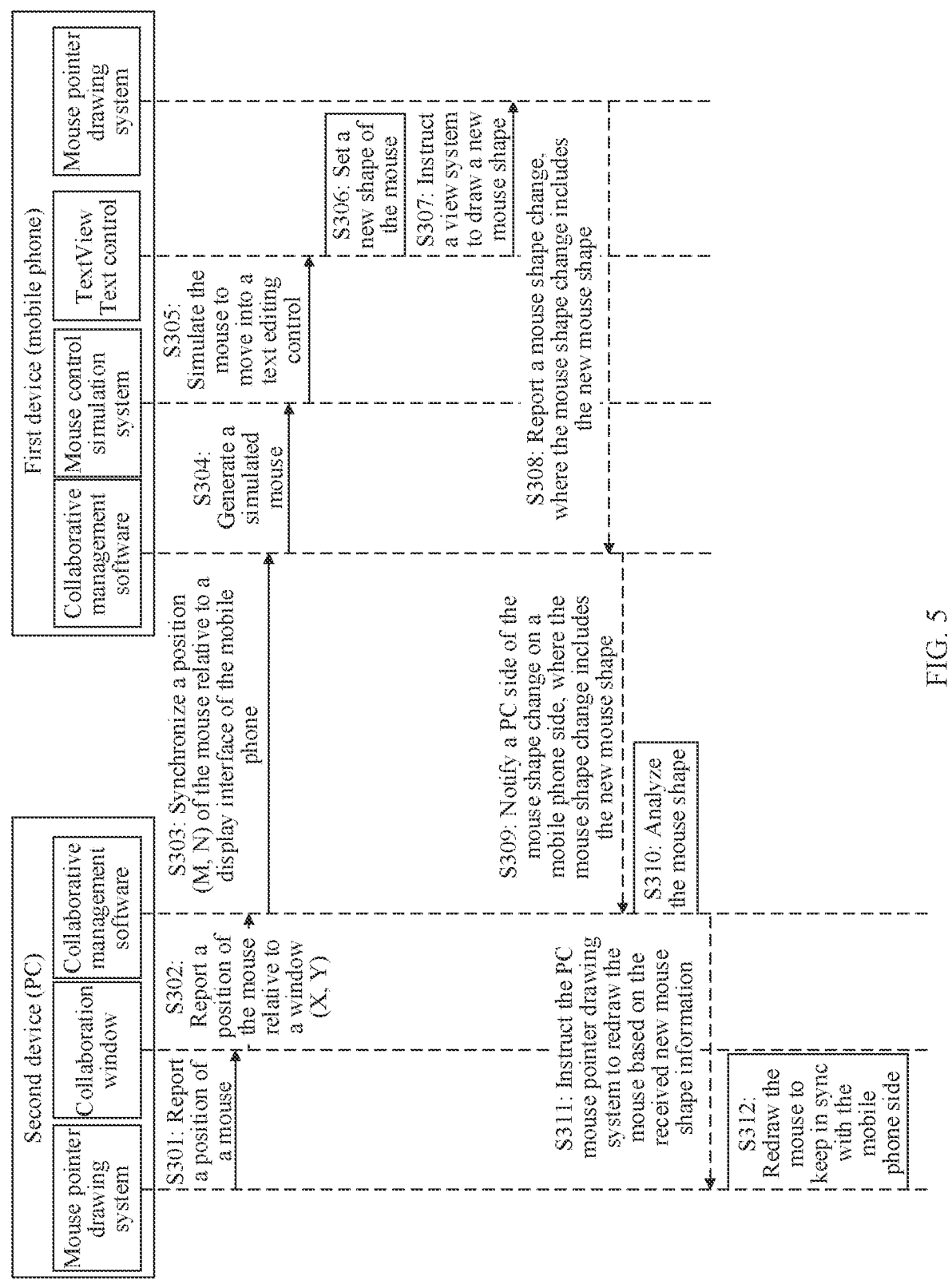
FIG. 5 is a flowchart of a display control method for a pointer in a window according to another embodiment of this application.

In an implementation, the specific implementation of "the second device obtains relative position information of the mouse pointer in the display interface of the first device" can be realized by performing step 301 and step 302 provided by the embodiment shown in FIG. 5. The scenario in which the first device is the mobile phone and the second device is the PC is used as an example, but it is not limited to the above scenario. The display control method of the pointer in the window provided by the embodiment of this application is also applicable to another scenario composed of another device.

Step 301: The mouse pointer drawing system of the second device (PC) reports a PC mouse position to the collaboration window.

Step 302: The collaboration window sends a position (X, Y) of the second device (PC) mouse relative to the collaboration window to the collaboration management software of the second device (PC), so that the collaborative management software of the second device (PC) converts the position (X, Y) of the PC mouse relative to the collaboration window into the position (M, N) of the display interface of the second device (PC) mouse relative to the first device (mobile phone).

Figure 6:
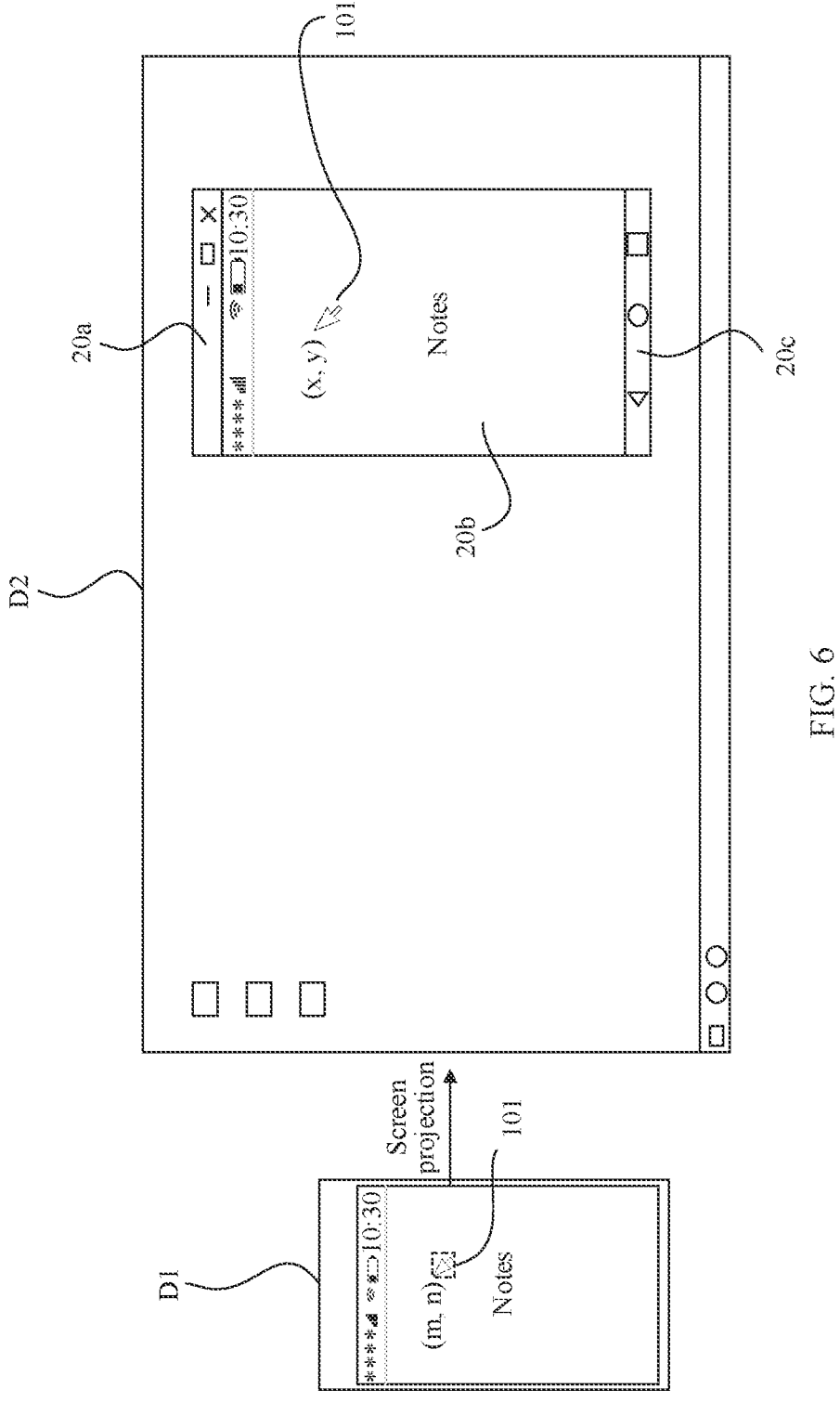
FIG. 6 is a schematic diagram of relative pixel position conversion according to an embodiment of this application.

FIG. 6 is a schematic diagram of relative pixel position conversion according to an embodiment of this application. As shown in FIG. 6, when the mouse pointer 101 of the second device (such as the PC device D2) moves into the collaboration window 20*b*, the mouse pointer drawing system of the second device can obtain the pixel position (X, Y) of the pointer of the second device in the collaboration window, and report the pixel position (X, Y) of the pointer in the collaboration window to the collaboration window of the second device. In this way, the collaboration window of the second device converts the pixel position (X, Y) of the pointer 101 of the second device in the collaboration window into the relative pixel position (M, N) of the pointer 101 in the display interface of the first device based on the ratio of the collaboration window to the display interface of the first device (such as the mobile phone D1). As a result, the relative position information of the mouse pointer of the second device in the display interface of the first device is obtained. It should be noted that the pointer 101 in the display interface of the first device shown in FIG. 6 shows the relative position of the pointer 101 of the second device in the display interface of the first device.

In a specific implementation of step 202, the second device may send the first message to the first device. The first message may include relative position information determined in step 201. The relative position information is relative position information of the pointer of the second device currently in the display interface of the first device. In an implementation, the specific implementation of "The second device sends a first message to the first device, where the first message includes the relative position information of the mouse pointer in the display interface of the first device" may be implemented by performing the step 303 provided by the embodiment shown in FIG. 5.

Step 303: The collaborative management software in the second device can send the relative pixel position (M, N) of the pointer in the display interface of the first device (the mobile phone) to the collaborative management software of the first device.

Further, the second device can determine the relative position information of the pointer relative to the first device display interface in real time based on the real-time position information of the pointer of the second device in the collaboration window through step 201 and step 202, and synchronize the relative position information of the pointer with respect to the display interface of the first device to the first device.

In a specific implementation of step 203, when the first device determines that the relative position information in the first message is in a target sub-area of a display control of the first device, the first device obtains pointer shape information that matches the target sub-area. In an implementation, the specific implementation of "When the first device determines that the relative position information in the first message is in a target sub-area of a display control of the first device, the first device obtains pointer shape information that matches the target sub-area" can be realized by performing step 304 to step 308 provided by the embodiment shown in FIG. 5. The implementation steps of step 304 to step 308 are as follows.

Step 304: The collaborative management software of the first device (the mobile phone) generates a simulated mouse at the corresponding position on the display interface based on the relative pixel position (M, N) synchronized by the second device.

Step 305: The mouse control simulation system of the first device (the mobile phone) simulates a mouse movement based on the relative pixel position (M, N) synchronized by the second device in real time. A view system of the first device (the mobile phone) can determine whether the simulated input mouse pointer enters the target sub-area of the display control of the first device based on the simulated mouse movement. If it is determined to enter a certain target sub-area, step 306 is performed, and if no target sub-area is entered, the movement event of the simulated input mouse pointer is continued to monitor. The target sub-area is an area where the mouse pointer needs to be transformed from a normal pointer shape to an area corresponding to the mouse pointer shape, that is, the area occupied by the display control. For example, the mouse pointer moves to the text area and the mouse pointer is transformed into a text cursor.

Step 306: A corresponding control in the view system of the first device (the mobile phone) matches the pointer type corresponding to the target sub-area currently entered by the mouse pointer of the simulated input based on the mapping relationship between the target sub-area and the mouse pointer type, and obtains the pointer shape information corresponding to the pointer type in the target pointer icon library based on the pointer type.

Step 307: The corresponding control in the view system of the first device (the mobile phone) sends the pointer shape information corresponding to the pointer type to the mouse pointer drawing system of the first device (the mobile phone).

Step 308: The mouse pointer drawing system of the first device (the mobile phone) redraws the simulated mouse shape based on the received pointer shape information, and reports mouse shape change information once to the collaborative management software of the first device (the mobile phone). The mouse shape change information includes shape information of a changed mouse. The shape information of the changed mouse can include a mouse shape label, and the collaborative management software of the second device (PC) can obtain the changed mouse shape on the mobile phone side based on an analysis of the mouse shape label.

After the first device synchronizes a mouse pointer pattern of the device to the second device, the first device can simulate the pointer type corresponding to the target sub-area currently entered by the mouse pointer. Specifically, the first device can determine the pointer type corresponding to the target sub-area currently entered by the simulated mouse pointer based on the mapping relationship between the target sub-area and the mouse pointer type. The mapping relationship between the target sub-area and the mouse pointer type may be pre-stored in the first device. For example, if the simulated input mouse pointer is currently in the text area, the corresponding mouse pointer type is a text selection type. If the simulated input mouse pointer is currently in the image area, the corresponding mouse pointer type may be a size adjustment type. Specifically, if the mouse pointer of the simulated input is located on two sides of the image area in a horizontal direction, the size adjustment pointer is the horizontal adjustment pointer. If the mouse pointer of the simulated input is located on two sides of the image area in a vertical direction, the size adjustment pointer is the vertical adjustment pointer. If the mouse pointer of the analog input is on a certain corner of the image area, the size adjustment pointer is the diagonal adjustment pointer. The pointer type corresponding to another target sub-area can be determined based on the mapping relationship between the target sub-area and the mouse pointer type, which is not be repeated here.

After the collaborative management module of the first device determines the pointer type corresponding to the target sub-area currently entered by the mouse pointer of the simulated input, further, the pointer shape information corresponding to the pointer type can be obtained in the target pointer icon library selected and used by the user according to the pointer type. The mouse pointer drawing system on the first device side can redraw the mouse pointer shape of the simulated input based on the pointer shape information corresponding to the pointer type.

In some implementations, the first device side can also set the properties of the simulated input mouse pointer during the process of simulating the mouse pointer input. The properties of the simulated input mouse pointer may include visible properties of the mouse pointer, specifically, the collaborative management module of the first device can set the mouse pointer of the simulated input to a hidden state. That is to say, the user cannot see the mouse pointer of the simulated input on the display interface of the first device, and the collaborative management module of the first device can also monitor the movement of the mouse pointer of the simulated input in the hidden state.

In a specific implementation of step 204, the first device may send the second message to the second device, and the second message may include pointer shape information corresponding to the target sub-area currently entered by the mouse pointer of the simulated input. In an implementation, the specific implementation of step 204 can be realized by performing step 309 provided by the embodiment shown in FIG. 5.

Step 309: The collaborative management software of the first device (the mobile phone) synchronizes the changed pointer shape information obtained by matching to the collaborative management software of the second device.

In a specific implementation of step 205, the second device may configure the display shape of the pointer in the collaboration window based on the pointer shape information contained in the received second message. A specific implementation of step 205 may be implemented by performing step 310 to step 312 provided by the embodiment shown in FIG. 5. Specifically, step 310 to step 312 includes the following.

Step 310: The collaborative management software of the second device (PC) analyzes the mouse shape label contained in the received mouse shape change information to determine the changed mouse shape. Specifically, the collaborative management software of the second device (PC) can match the mouse pointer icon library through the mouse shape label to obtain the corresponding mouse shape information.

Step 311: The collaborative management software of the second device (PC) sends the analyzed mouse shape information to the mouse pointer drawing system of the second device (PC).

Step 312: The mouse pointer drawing system of the second device (PC) redraws the mouse based on the received mouse shape information, so that the PC mouse in the collaboration window is synchronized with the mouse shape on the mobile phone side.

Figure 7:
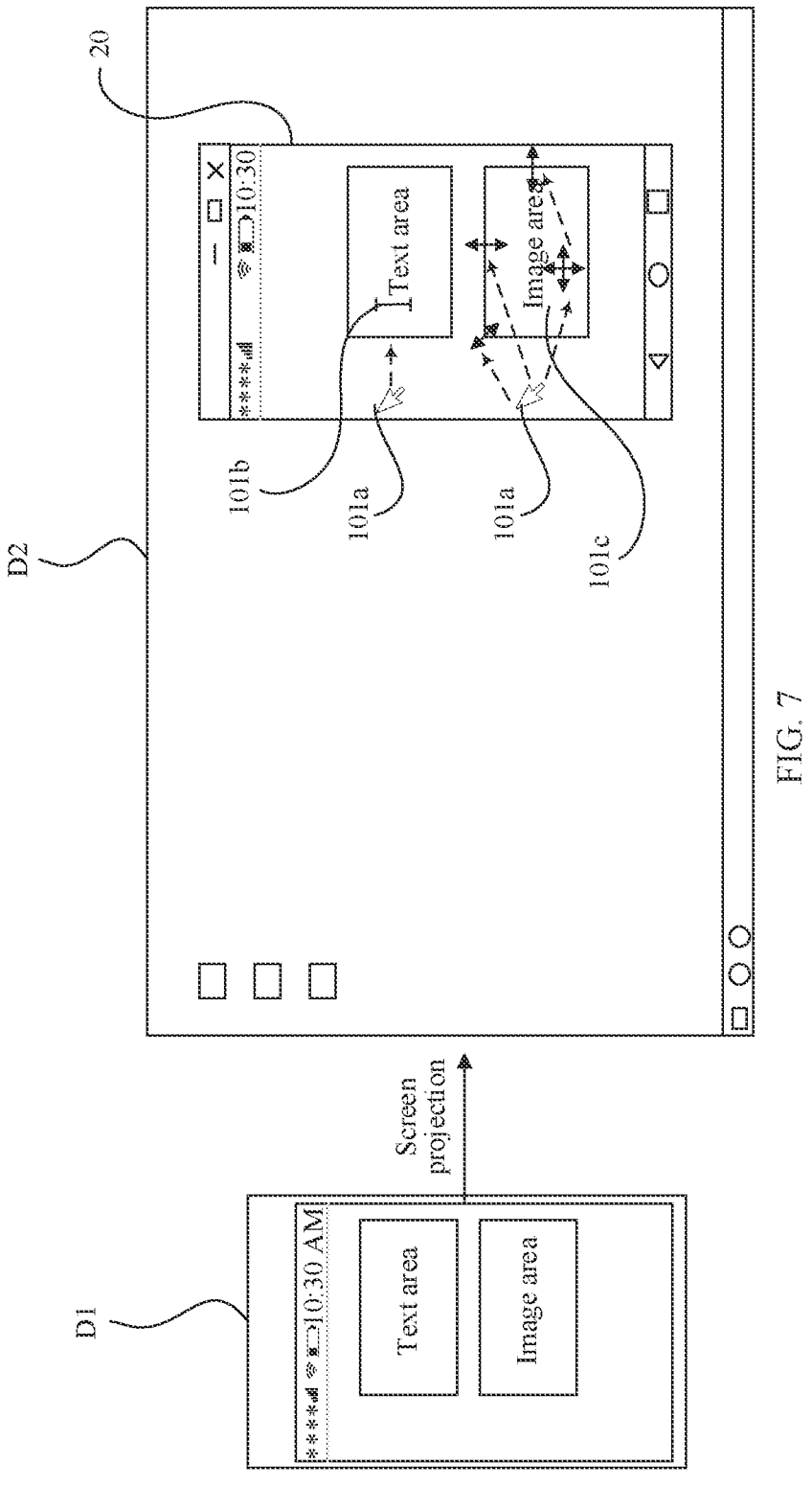
FIG. 7 is a schematic diagram of mouse pointer conversion according to an embodiment of this application.

Through the above step 201 to step 205, the first device can simulate the mouse pointer input on the display interface of the first device based on the real-time position information of the pointer synchronized by the second device, monitor the movement event of the simulated input mouse pointer, and determine whether the simulated input mouse pointer enters the target sub-area based on the monitoring information. If it is determined to enter the target sub-area, the pointer shape information matching the target sub-area currently entered by the simulated input mouse pointer is obtained, and the obtained pointer shape information is synchronized to the second device. The second device may configure the pointer shape in the collaboration window based on the received pointer shape information. Further, after the pointer in the collaboration window is transformed accordingly, when the user operates the mouse again, the corresponding operation of a target element in the target sub-area can be realized through the transformed mouse pointer. FIG. 7 is a schematic diagram of mouse pointer conversion according to an embodiment of this application. For example, as shown in FIG. 7, after the pointer enters the text area of the collaboration window, the user can select the target text by clicking and dragging the mouse after the pointer 101*a* is converted into the text selection pointer 101*b*, so that the operation of selecting the target text is faster and improves user experience. Similarly, after the pointer enters the image area of the collaboration window, the pointer 101*a* is converted into the size adjustment pointer 101*c*, and the user can click and drag the mouse to adjust the size of a target picture.

Figure 8:
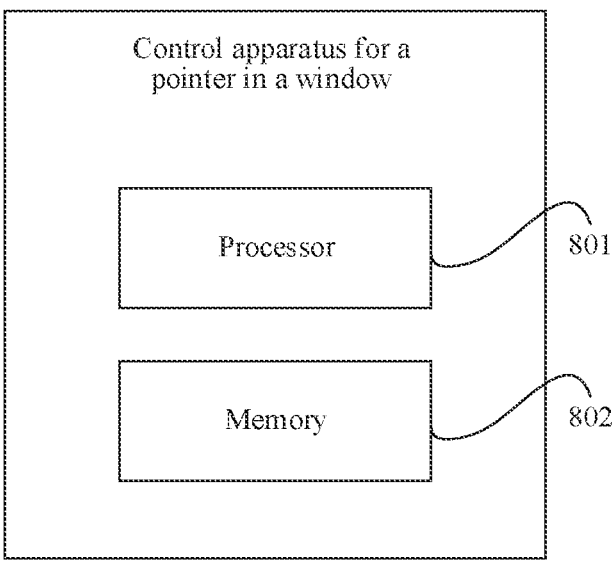
FIG. 8 is a schematic structural diagram of a display control apparatus for a pointer in a window according to another embodiment of this application.

FIG. 8 is a schematic structural diagram of a display control apparatus for a pointer in a window according to another embodiment of this application. As shown in FIG. 8, the apparatus may include a processor 801 and a memory 802. The memory 802 is configured to store at least one instruction, and the instruction, when loaded and executed by the processor 801, implements the display control method for a pointer in a window according to any one of embodiments of this application.

In an implementation, the display control apparatus of the pointer in the window provided by the embodiment shown in FIG. 8 may be a component of a device, for example, the component is a chip or a chip module.

An embodiment of this application further provides an electronic device. The electronic device may include the display control apparatus for the pointer in the window provided by the embodiment shown in FIG. 8. The electronic device can be used as both the first device and the second device. Moreover, the collaboration window generated by the first device projecting to the second device may be the display interface currently displayed on the first device screen or the screen projection interface of the application running on the first device (a foreground or a background).

An embodiment of this application further provides a system. The system includes a first device and a second device, where the first device and the second device are the electronic device according to the third aspect. In an implementation, the first device may be the mobile phone D1, the second device may be the PC device D2, and the mobile phone D1 projects a screen to the PC device D2 and generates a corresponding collaboration window on the PC device D2. The display content of the collaboration window can be consistent with the display content of the display interface of the mobile phone D1.

It should be noted that the electronic device involved in embodiments of this application may include, but is not limited to, a personal computer (Personal Computer, PC), a personal digital assistant (Personal Digital Assistant, PDA), a wireless handheld device, a tablet computer (Tablet Computer), a mobile phone, a smart wearable device with a display function, a large-screen device, and the like.

An embodiment of this application further provides a computer-readable storage medium, storing a computer program, where the computer program, when executed by a processor, implements the display control method for a pointer in a window according to any one of embodiments.

It should be understood that the application may be a native App (nativeApp) installed on the terminal, or may also be a web App (webApp) of a browser on the terminal, which is not limited in the embodiment of this application.

A person skilled in the art can clearly understand that for convenience and conciseness of description, for specific working processes of the foregoing systems, apparatuses and units, reference may be made to the corresponding processes in the foregoing method embodiments, and details are not described herein again.

In the several embodiments provided in this application, it should be understood that the disclosed system, apparatus, and method may be implemented in other manners. For example, the described apparatus embodiments are merely schematic. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in embodiments of this application may be integrated into one processing unit, or each of the units may be physically separated, or two or more units may be integrated into one unit. The integrated unit may be implemented in a form of hardware, or may be implemented in a form of a hardware and software functional unit.

The integrated unit implemented in the form of a software functional unit may be stored in a computer-readable storage medium. The software functional unit is stored on a storage medium, and includes a plurality of instructions to cause a computer apparatus (which may be a personal computer, a server, a network apparatus, or the like) or a processor (Processor) to perform all or some of the steps of the embodiment methods of this application. The storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely exemplary embodiments of this application, but are not intended to limit this application. Any modification, equivalent replacement, improvement, or the like made without departing from the spirit and principle of this application shall fall within the protection scope of this application.

Finally, it should be noted that the foregoing embodiments are merely used for describing the technical solutions of this application, but are not intended to limit this application. Although embodiments of this application are described in detail with reference to the foregoing embodiments, it should be appreciated by a person of ordinary skill in the art that, modifications may still be made to the technical solutions recorded in the foregoing embodiments, or equivalent replacements may be made to some or all of the technical features; and these modifications or replacements do not cause the essence of corresponding technical solutions to depart from the scope of the technical solutions in embodiments of this application.

What is claimed is:

1. A method, comprising:

displaying a mouse pointer in a first shape in response to the mouse pointer of a second device being in a first area of a collaboration window, wherein the collaboration window is generated in response to a first device projecting a screen onto the second device; and displaying the mouse pointer in a second shape in response to the mouse pointer of the second device being in a second area of the collaboration window, and in response to the first device:

receiving, from the second device, relative position information of the mouse pointer in the collaboration window relative to a display interface of the first device;

obtaining pointer shape information matching a target sub-area based on the relative position information being in the target sub-area of the display control of the first device; and feeding back the pointer shape information matching the target sub-area to the second device to cause the second device to display the mouse pointer in the second shape in response to the mouse pointer of the second device being in the second area of the collaboration window, wherein the second area comprises an area occupied by each control in the collaboration window, and the first area is an area other than the second area in the collaboration window.

2. The method of claim 1, wherein the area occupied by each display control in the collaboration window comprises a text area and an image area, and wherein the text area is an area occupied by a text control in the collaboration window, and the image area is an area occupied by an image control in the collaboration window.

3. The method of claim 1, wherein before the relative position information is in the target sub-area of the display control of the first device, the method further comprises simulating a mouse pointer input based on the relative position information of the mouse pointer of the second device on the display interface of the first device.

4. The method of claim 3, wherein the relative position information being in the target sub-area of the display control of the first device comprises a current position of the mouse pointer falling in the target sub-area of the display control of the first device in a stage of simulating the mouse pointer input and based on a monitored mouse pointer movement event.

5. The method of claim 4, wherein in the stage of simulating the mouse pointer input, the method further comprises setting visible properties of the mouse pointer to hidden.

6. The method of claim 4, wherein obtaining mouse pointer shape information matching the target sub-area comprises, based on a mapping relationship between the target sub-area and a mouse shape, the mouse pointer shape information corresponding to the target sub-area where the current position of the mouse pointer falls.

7. The method of claim 1, wherein before receiving relative position information of the mouse pointer in the collaboration window relative to the display interface of the first device, the method further comprises synchronizing one or more sets of pointer icon libraries on the first device to the second device, so that the second device parses the pointer shape information matching the target sub-area based on a received one of the pointer icon libraries, and then obtains a current pointer shape.

8. The method of claim 1, wherein displaying the mouse pointer in the second shape in response to the mouse pointer of the second device being in the second area of the collaboration window comprises:
   sending the relative position information of the mouse pointer in the collaboration window relative to the display interface of the first device to the first device; and
   receiving the pointer shape information from the first device, and configuring a display shape of the mouse pointer in the collaboration window based on the pointer shape information.

9. The method of claim 8, wherein before sending the relative position information of the mouse pointer in the collaboration window relative to the display interface of the first device to the first device, the method further comprises:
   obtaining position information of the mouse pointer of the second device in the collaboration window; and
   converting, based on a ratio of the collaboration window to the display interface of the first device, the position information of the mouse pointer of the second device in the collaboration window into relative position information of the mouse pointer of the second device on the display interface of the first device.

10. The method of claim 8, wherein before sending the relative position information of the mouse pointer in the collaboration window relative to the display interface of the first device to the first device, the method further comprises obtaining one or more sets of pointer icon libraries synchronized by the first device, wherein configuring the display shape of the mouse pointer in the collaboration window based on the pointer shape information comprises parsing the pointer shape information matching the target sub-area based on a received one of the pointer icon libraries, and then obtaining a current pointer shape.

11. A method, comprising:
   receiving, from a second device, relative position information of a mouse pointer in a collaboration window relative to a display interface of a first device, wherein the collaboration window is generated in response to the first device projecting a screen onto the second device;
   obtaining pointer shape information matching a target sub-area based on the relative position information being in the target sub-area of a display control of the first device; and
   feeding back the pointer shape information matching the target sub-area to the second device, to cause the second device to:
      display the mouse pointer in a first shape in response to the mouse pointer of the second device being in a first area of the collaboration window; and
      display the mouse pointer in a second shape in response to the mouse pointer of the second device being in a second area of the collaboration window.

12. A system, comprising:
   a second device; and
   a first device configured to project a screen onto the second device to generate a collaboration window, wherein the second device is configured to:

display a mouse pointer in a first shape in response to the mouse pointer of the second device being in a first area of the; and
      display the mouse pointer in a second shape in response to the mouse pointer of the second device being in a second area of the collaboration window, and in response to the first device:
         receiving, from the second device, relative position information of the mouse pointer in the collaboration window relative to a display interface of the first device;
         obtaining pointer shape information matching a target sub-area based on the relative position information being in the target sub-area of the display control of the first device; and
         feeding back the pointer shape information matching the target sub-area to the second device to cause the second device to display the mouse pointer in the second shape in response to the mouse pointer of the second device being in the second area of the collaboration window,
      wherein the second area comprises an area occupied by each control in the collaboration window, and the first area is an area other than the second area in the collaboration window.

13. The system of claim 12, wherein the area occupied by each display control in the collaboration window comprises a text area and an image area, and wherein the text area is an area occupied by a text control in the collaboration window, and the image area is an area occupied by an image control in the collaboration window.

14. The system of claim 12, wherein before the relative position information is in the target sub-area of the display control of the first device, the first device simulates a mouse pointer input based on the relative position information of the mouse pointer of the second device on the display interface of the first device.

15. The system of claim 14, wherein the relative position information being in the target sub-area of the display control of the first device comprises a current position of the mouse pointer falling in the target sub-area of the display control of the first device in a stage of simulating the mouse pointer input, and based on a monitored mouse pointer movement event.

16. The system of claim 15, wherein in the stage of simulating the mouse pointer input, the first device sets visible properties of the mouse pointer to hidden.

17. The system of claim 15, wherein the first device obtaining mouse pointer shape information matching the target sub-area comprises, based on a mapping relationship between the target sub-area and a mouse shape, the mouse pointer shape information corresponding to the target sub-area where the current position of the mouse pointer falls.

18. The system of claim 12, wherein before the first device receives relative position information of the mouse pointer in the collaboration window relative to the display interface of the first device from the second device, the first device is configured to synchronize one or more sets of pointer icon libraries on the first device to the second device, so that the second device parses the pointer shape information matching the target sub-area based on a received one of the pointer icon libraries, and then the second device obtains a current pointer shape.

19. The method of claim 11, wherein before receiving relative position information of the mouse pointer in the collaboration window relative to the display interface of the first device, the method further comprises synchronizing one or more sets of pointer icon libraries on the first device to the second device, so that the second device is configured to parse the pointer shape information matching the target sub-area based on a received one of the pointer icon libraries, and then to obtain a current pointer shape.

20. The method of claim 11, wherein before the relative position information is in the target sub-area of the display control of the first device, the method further comprises simulating a mouse pointer input based on the relative position information of the mouse pointer of the second device on the display interface of the first device.

\* \* \* \* \*